(12) United States Patent
Raghavan et al.

(10) Patent No.: US 12,212,378 B2
(45) Date of Patent: Jan. 28, 2025

(54) GENERATING AN INTERFERENCE MODEL VIA CROWDSOURCING OPERATIONS

(71) Applicant: QUALCOMM Incorporated, San Diego, CA (US)

(72) Inventors: Vasanthan Raghavan, West Windsor Township, NJ (US); Marco Papaleo, Bologna (IT); Ozge Koymen, Princeton, NJ (US); Junyi Li, Fairless Hills, PA (US); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 399 days.

(21) Appl. No.: 17/813,883

(22) Filed: Jul. 20, 2022

(65) Prior Publication Data

US 2024/0031046 A1    Jan. 25, 2024

(51) Int. Cl.
*H04B 17/373* (2015.01)
*H04W 24/10* (2009.01)

(52) U.S. Cl.
CPC .......... *H04B 17/373* (2015.01); *H04W 24/10* (2013.01)

(58) Field of Classification Search
CPC .. H04B 17/373; H04B 17/318; H04B 17/345; H04W 24/00; H04W 24/10
See application file for complete search history.

(56) References Cited

U.S. PATENT DOCUMENTS

| | | | |
|---|---|---|---|
| 2012/0224556 A1* | 9/2012 | Yoon | H04L 5/0048 370/329 |
| 2021/0227411 A1* | 7/2021 | Luo | H04W 24/02 |
| 2021/0328847 A1* | 10/2021 | Zach | H04B 7/0617 |

\* cited by examiner

*Primary Examiner* — Khoa Huynh
(74) *Attorney, Agent, or Firm* — Kevin M. Donnelly; Harrity & Harrity, LLP

(57) ABSTRACT

Various aspects of the present disclosure generally relate to wireless communication. In some aspects, a device may receive serving beam information associated with a plurality of wireless communication devices. The device may generate an interference model based at least in part on the serving beam information associated with the plurality of wireless communication devices, the interference model indicating locations of one or more clusters in a channel environment. The device may obtain, using the interference model, information associated with an interference prediction for a transmitting wireless communication device. The device may transmit the information associated with the interference prediction to the transmitting wireless communication device. Numerous other aspects are provided.

30 Claims, 9 Drawing Sheets

GENERATING AN INTERFERENCE MODEL VIA CROWDSOURCING OPERATIONS

FIELD OF THE DISCLOSURE

Aspects of the present disclosure generally relate to wireless communication and specifically, to techniques and apparatuses associated with generating an interference model via crowdsourcing operations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

As the quantity of antenna elements at UEs and network nodes within a wireless communication system increases (for example, as carrier frequency increases), and as density of wireless communication devices in the wireless communication system increases, interference can become problematic. For example, signals generated by UEs, network nodes, or other types of nodes in the wireless communication system can cause interference within the wireless communication system (for example, among wireless communication devices of the wireless communication system), thereby reducing performance and reliability of the wireless communication system. Further, signals generated by UEs, network nodes, or other types of nodes in the wireless communication system can cause interference to another service that coexists in the channel environment.

SUMMARY

Some aspects described herein relate to a method of wireless communication performed by a device. The method may include receiving serving beam information associated with a plurality of wireless communication devices. The method may include generating an interference model based at least in part on the serving beam information associated with the plurality of wireless communication devices, the interference model indicating locations of one or more clusters in a channel environment. The method may include obtaining, using the interference model, information associated with an interference prediction for a transmitting wireless communication device. The method may include transmitting the information associated with the interference prediction to the transmitting wireless communication device.

Some aspects described herein relate to a method of wireless communication performed by a wireless communication device. The method may include transmitting serving beam information associated with the wireless communication device. The method may include receiving information associated with an interference prediction, the information associated with the interference prediction being based at least in part on the serving beam information and an interference model, the interference model indicating locations of one or more clusters in a channel environment.

Some aspects described herein relate to an interference sensor for wireless communication. The interference sensor may include at least one processor and at least one memory, communicatively coupled with the at least one processor, that stores processor-readable code. The processor-readable code, when executed by the at least one processor, may be configured to cause the interference sensor to receive serving beam information associated with a plurality of wireless communication devices. The processor-readable code, when executed by the at least one processor, may be configured to cause the interference sensor to generate an interference model based at least in part on the serving beam information associated with the plurality of wireless communication devices, the interference model indicating locations of one or more clusters in a channel environment. The processor-readable code, when executed by the at least one processor, may be configured to cause the interference sensor to obtain, using the interference model, information associated with an interference prediction for a transmitting wireless communication device. The processor-readable code, when executed by the at least one processor, may be configured to cause the interference sensor to transmit the information associated with the interference prediction to the transmitting wireless communication device.

Some aspects described herein relate to a wireless communication device for wireless communication. The wireless communication device may include at least one processor and at least one memory, communicatively coupled with the at least one processor, that stores processor-readable code. The processor-readable code, when executed by the at least one processor, may be configured to cause the wireless communication device to transmit serving beam information associated with the wireless communication device. The processor-readable code, when executed by the at least one processor, may be configured to cause the wireless communication device to receive information associated with an interference prediction, the information associated with the interference prediction being based at least in part on the serving beam information and an interference model, the interference model indicating locations of one or more clusters in a channel environment.

Some aspects described herein relate to a non-transitory computer-readable medium that stores a set of instructions for wireless communication by a one or more instructions that, when executed by one or more processors of an interference sensor. The set of instructions, when executed by one or more processors of the one or more instructions that, when executed by one or more processors of an interference sensor, may cause the one or more instructions that, when executed by one or more processors of an interference sensor to receive serving beam information associated with a plurality of wireless communication devices. The set of instructions, when executed by one or more processors of the one or more instructions that, when executed by one or more processors of an interference sensor, may cause the one or more instructions that, when executed by one or more processors of an interference sensor to generate an interference model based at least in part on the serving beam information associated with the plurality of wireless communication devices, the interference model indicating locations of one or more clusters in a channel environment. The set of instructions, when executed by one or more processors of the one or more instructions that, when executed by one or more processors of an interference sensor, may cause the one or more instructions that, when executed by one or more processors of an interference sensor to obtain, using the interference model, information associated with an interference prediction for a transmitting wireless communication device. The set of instructions, when executed by one or more processors of the one or more instructions that, when executed by one or more processors of an interference sensor, may cause the one or more instructions that, when executed by one or more processors of an interference sensor to transmit the information associated with the interference prediction to the transmitting wireless communication device.

Some aspects described herein relate to a non-transitory computer-readable medium that stores a set of instructions for wireless communication by a wireless communication device. The set of instructions, when executed by one or more processors of the wireless communication device, may cause the wireless communication device to transmit serving beam information associated with the wireless communication device. The set of instructions, when executed by one or more processors of the wireless communication device, may cause the wireless communication device to receive information associated with an interference prediction, the information associated with the interference prediction being based at least in part on the serving beam information and an interference model, the interference model indicating locations of one or more clusters in a channel environment.

Some aspects described herein relate to an apparatus for wireless communication. The apparatus may include means for receiving serving beam information associated with a plurality of wireless communication devices. The apparatus may include means for generating an interference model based at least in part on the serving beam information associated with the plurality of wireless communication devices, the interference model indicating locations of one or more clusters in a channel environment. The apparatus may include means for obtaining, using the interference model, information associated with an interference prediction for a transmitting wireless communication device. The apparatus may include means for transmitting the information associated with the interference prediction to the transmitting wireless communication device.

Some aspects described herein relate to an apparatus for wireless communication. The apparatus may include means for transmitting serving beam information associated with the apparatus. The apparatus may include means for receiving information associated with an interference prediction, the information associated with the interference prediction being based at least in part on the serving beam information and an interference model, the interference model indicating locations of one or more clusters in a channel environment.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
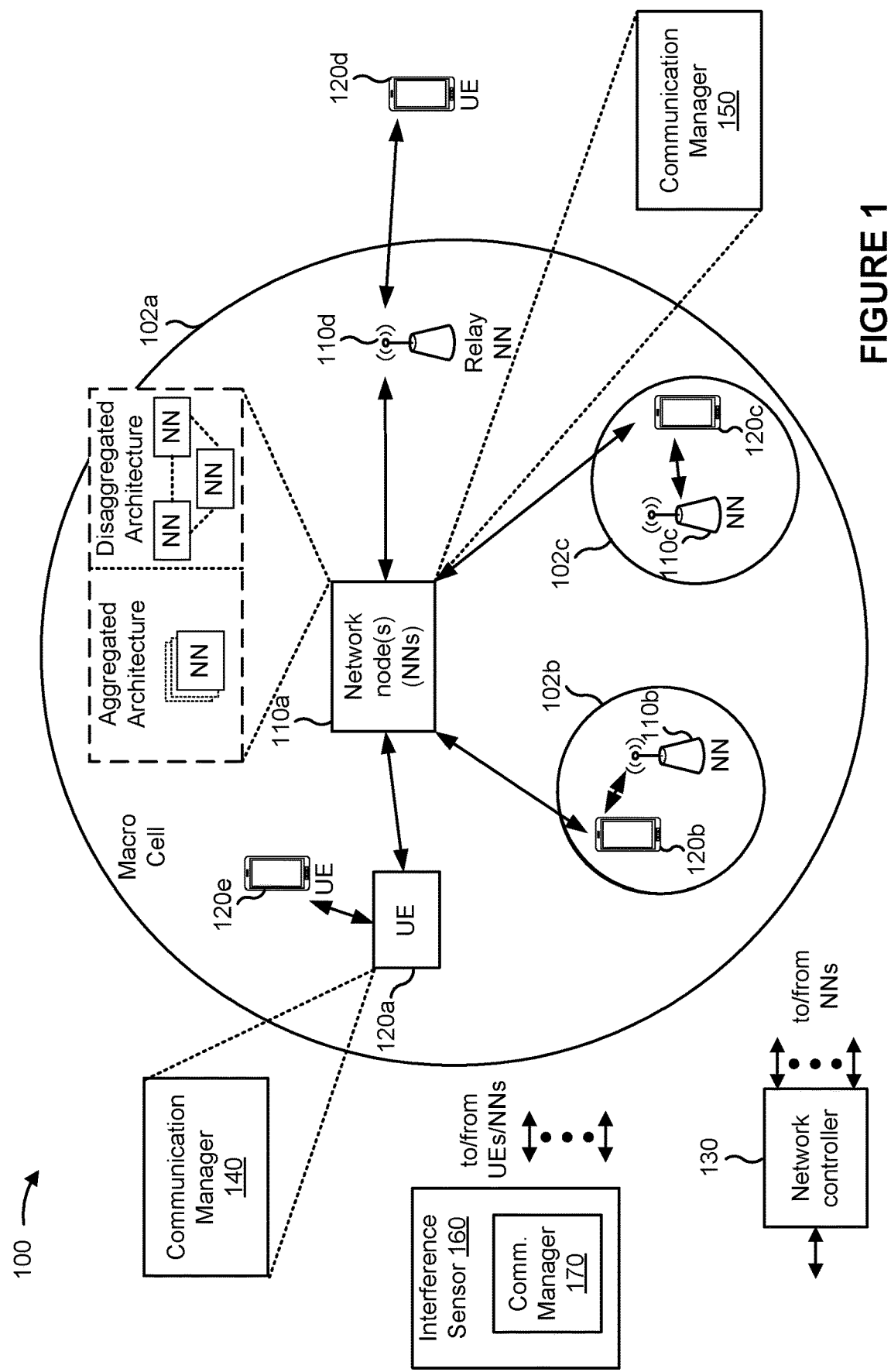
FIG. 1 is a diagram illustrating an example of a wireless network in accordance with the present disclosure.

Various aspects of the disclosure are described more fully hereinafter with reference to the accompanying drawings.

This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to generating an interference model via crowdsourcing operations. Some aspects more specifically relate to generation of an interference model from crowdsourcing information from multiple wireless communication devices (for example, user equipments (UEs) or network nodes), and utilization of the interference model to mitigate or reduce interference in or caused by the wireless communication system. In some aspects, an interference sensor may receive serving beam information associated with a plurality of wireless communication devices (for example, one or more UEs or one or more network nodes), and may generate an interference model based at least in part on the serving beam information associated with the plurality of wireless communication devices. In some aspects, the interference model indicates locations of one or more clusters in a channel environment. In some aspects, the interference sensor may obtain, using the interference model, information associated with an interference prediction for a transmitting wireless communication device (for example, a particular UE or network node) and may transmit the information associated with the interference prediction to the transmitting wireless communication device. The transmitting wireless communication device may in some aspects adjust one or more transmission parameters based at least in part on the information associated with the interference prediction.

Particular aspects of the subject matter described in this disclosure can be implemented to realize one or more of the following potential advantages. In some examples, the described techniques can be used to reduce or mitigate interference within or caused by a wireless communication system by enabling an interference sensor to predict interference that would be caused by a given wireless communication device. For example, the described techniques can be used to reduce or mitigate interference caused by the given wireless communication device to one or more other wireless communication devices in a wireless communication system. In this way, performance and reliability of wireless communication in the wireless communication system can be improved. As another example, the described techniques can be used to reduce or mitigate interference caused by a given wireless communication device to a coexisting service in a channel environment. In this way, interference to the coexisting service in the channel environment can be reduced or mitigated, thereby reducing an impact of the wireless communication device on the coexisting service.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110a, a network node 110b, a network node 110c, and a network node 110d), a user equipment (UE) 120 or multiple UEs 120 (shown as a UE 120a, a UE 120b, a UE 120c, a UE 120d, and a UE 120e), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the interference sensor 160 may include a communication manager 170. As described in more detail elsewhere herein, the communication manager 170 may receive serving beam information associated with a plurality of wireless communication devices; generate an interference model based at least in part on the serving beam information associated with the plurality of wireless communication devices, the interference model indicating locations of one or more clusters in a channel environment; obtain, using the interference model, information associated with an interference prediction for a transmitting wireless communication device; and transmit the information associated with the interference prediction to the transmitting wireless communication device. Additionally or alternatively, the communication manager 170 may perform one or more other operations described herein.

In some aspects, a UE 120 may include a communication manager 140 or a network node 110 may include a communication manager 150. As described in more detail elsewhere herein, the communication manager 140/150 may transmit serving beam information associated with the wireless communication device; and receive information associated with an interference prediction, the information associated with the interference prediction being based at least in part on the serving beam information and an interference model, the interference model indicating locations of one or more clusters in a channel environment. Additionally or alternatively, the communication manager 140/150 may perform one or more other operations described herein.

Figure 2:
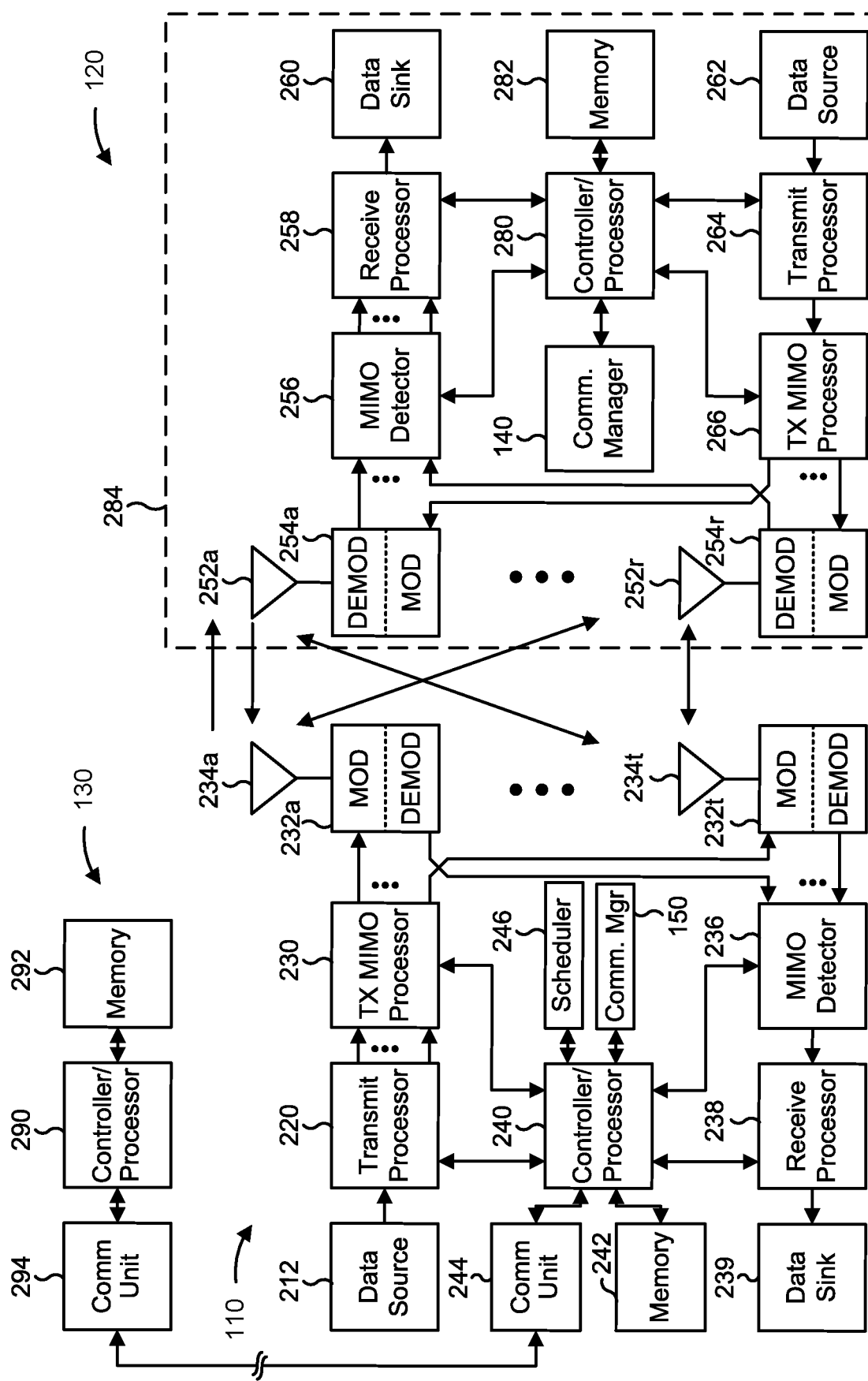
FIG. 2 is a diagram illustrating an example network node in communication with a user equipment (UE) in a wireless network in accordance with the present disclosure.

FIG. 2 is a diagram illustrating an example network node in communication with a user equipment (UE) in a wireless network in accordance with the present disclosure. The network node may correspond to the network node 110 of FIG. 1. Similarly, the UE may correspond to the UE 120 of FIG. 1. The network node 110 may be equipped with a set of antennas 234a through 234t, such as T antennas (T≥1). The UE 120 may be equipped with a set of antennas 252a through 252r, such as R antennas (R≥1). The network node 110 of depicted in FIG. 2 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232*a* through 232*t*. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232*a* through 232*t* may transmit a set of downlink signals (for example, T downlink signals) via a corresponding set of antennas 234 (for example, T antennas), shown as antennas 234*a* through 234*t*.

At the UE 120, a set of antennas 252 (shown as antennas 252*a* through 252*r*) may receive the downlink signals from the network node 110 or other network nodes 110 and may provide a set of received signals (for example, R received signals) to a set of modems 254 (for example, R modems), shown as modems 254*a* through 254*r*. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with generating an interference model via crowd-sourcing operations, as described in more detail elsewhere herein.

Figure 5:
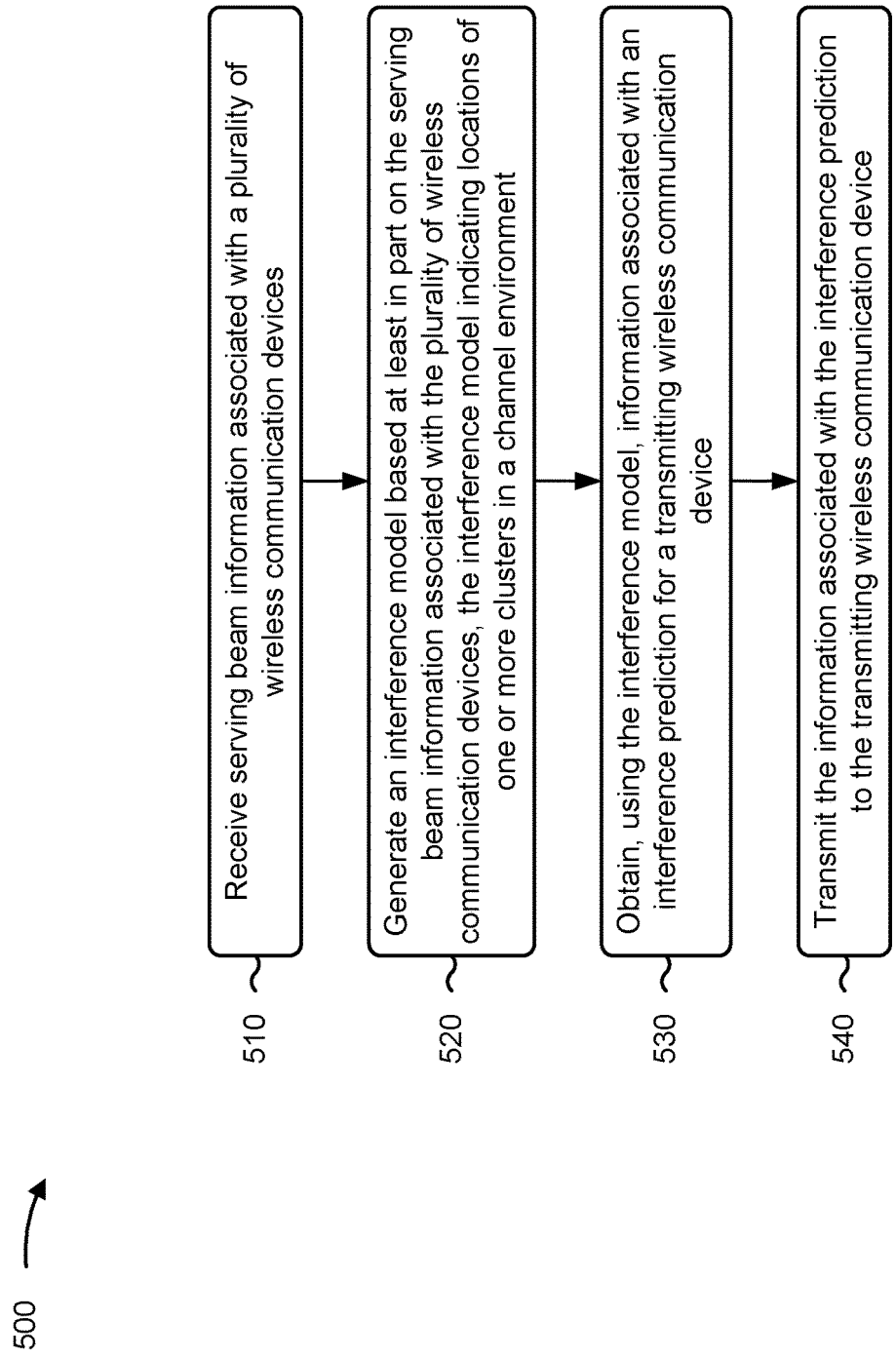
FIG. 5 is a flowchart illustrating an example process performed, for example, by an interference sensor that supports generating an interference model via crowdsourcing operations in accordance with the present disclosure.

For example, the controller/processor 240 of the network node 110, the controller/processor 280 of the UE 120, or any other component(s) of FIG. 2 may perform or direct operations of, for example, process 500 of FIG. 5, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 500 of FIG. 5, or other processes as described herein. In some examples, executing instructions may include running the instructions, converting the instructions, compiling the instructions, or interpreting the instructions, among other examples.

In some aspects, a wireless communication device, such as a UE 120 or a network node 110, includes means for transmitting serving beam information associated with the wireless communication device; or means for receiving information associated with an interference prediction, the information associated with the interference prediction being based at least in part on the serving beam information and an interference model, the interference model indicating locations of one or more clusters in a channel environment. In some aspects, such as when the wireless communication device is a network node 110, the means for the wireless communication device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, such as when the wireless communication device is a UE 120, the means for the wireless communication device to perform operations described herein may include, for example, one or more of communication manager 140, antenna 252, modem 254, MIMO detector 256, receive processor 258, transmit processor 264, TX MIMO processor 266, controller/processor 280, or memory 282.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
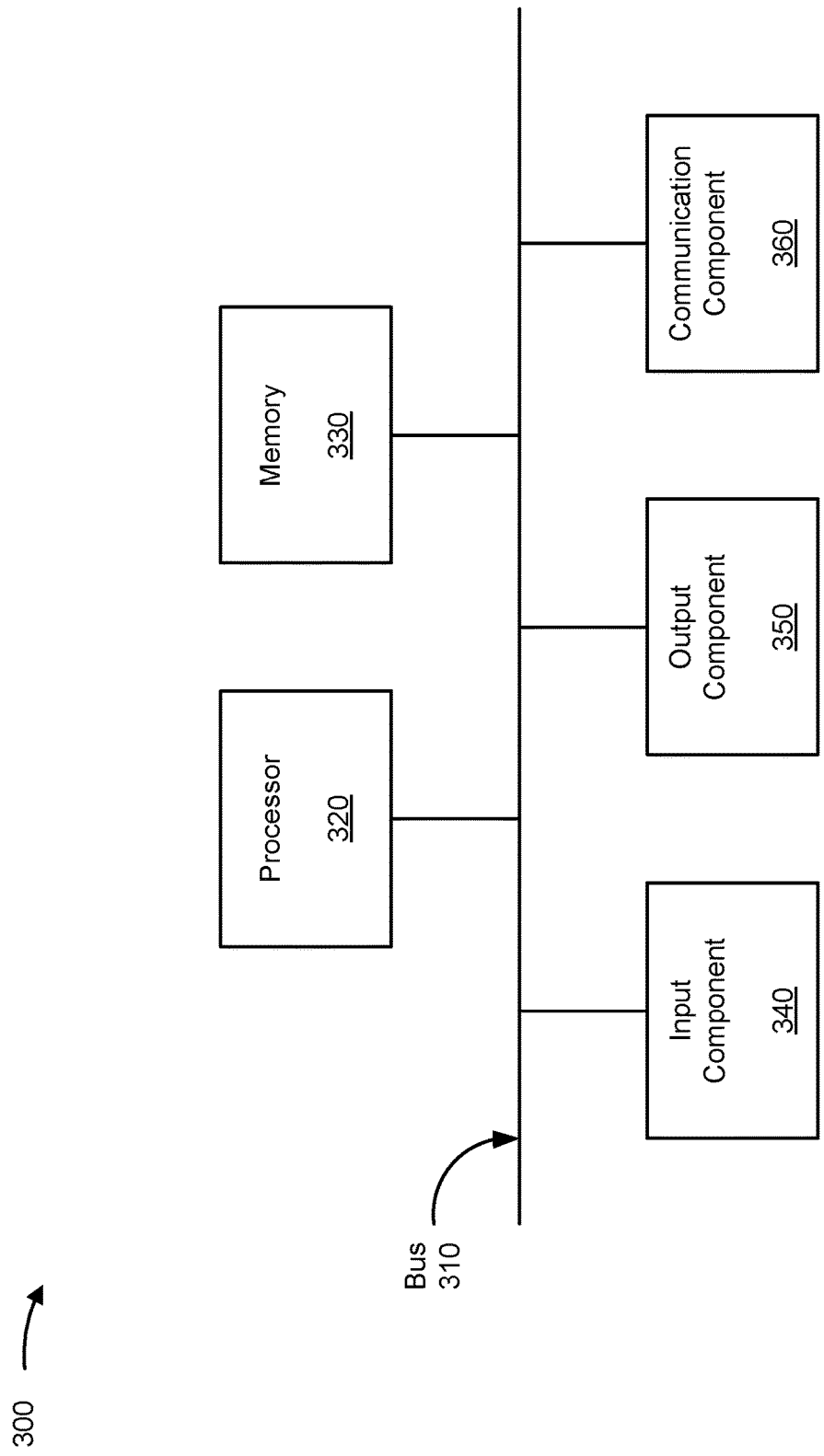
FIG. 3 is a diagram of example components of a device associated with generating an interference model via crowdsourcing operations.

FIG. 3 is a diagram of example components of a device 300 associated with generating an interference model via crowdsourcing operations. Device 300 may correspond to interference sensor 160. In some implementations, interference sensor 160 may include one or more devices 300 or one or more components of device 300. As shown in FIG. 3, device 300 may include a bus 310, a processor 320, a memory 330, an input component 340, an output component 350, and a communication component 360.

Bus 310 may include one or more components that enable wired or wireless communication among the components of device 300. Bus 310 may couple together two or more components of FIG. 3, such as via operative coupling, communicative coupling, electronic coupling, or electric coupling. Processor 320 may include a central processing unit, a graphics processing unit, a microprocessor, a controller, a microcontroller, a digital signal processor, a field-programmable gate array, an application-specific integrated circuit, or another type of processing component. Processor 320 is implemented in hardware, firmware, or a combination of hardware and software. In some implementations, processor 320 may include one or more processors capable of being programmed to perform one or more operations or processes described elsewhere herein.

Memory 330 may include volatile or nonvolatile memory. For example, memory 330 may include random access memory (RAM), read only memory (ROM), a hard disk drive, or another type of memory (for example, a flash memory, a magnetic memory, or an optical memory). Memory 330 may include internal memory (for example, RAM, ROM, or a hard disk drive) or removable memory (for example, removable via a universal serial bus connection). Memory 330 may be a non-transitory computer-readable medium. Memory 330 stores information, instructions, or software (for example, one or more software applications) related to the operation of device 300. In some implementations, memory 330 may include one or more memories that are coupled to one or more processors (for example, processor 320), such as via bus 310.

Input component 340 enables device 300 to receive input, such as user input or sensed input. For example, input component 340 may include a touch screen, a keyboard, a keypad, a mouse, a button, a microphone, a switch, a sensor, a global positioning system sensor, an accelerometer, a gyroscope, or an actuator. Output component 350 enables device 300 to provide output, such as via a display, a speaker, or a light-emitting diode. Communication component 360 enables device 300 to communicate with other devices via a wired connection or a wireless connection. For example, communication component 360 may include a receiver, a transmitter, a transceiver, a modem, a network interface card, or an antenna.

Device 300 may perform one or more operations or processes described herein. For example, a non-transitory computer-readable medium (for example, memory 330) may store a set of instructions (for example, one or more instructions or code) for execution by processor 320. Processor 320 may execute the set of instructions to perform one or more operations or processes described herein. In some implementations, execution of the set of instructions, by one or more processors 320, causes the one or more processors 320 or the device 300 to perform one or more operations or processes described herein. In some implementations, hardwired circuitry is used instead of or in combination with the instructions to perform one or more operations or processes described herein. Additionally or alternatively, processor 320 may be configured to perform one or more operations or processes described herein. Thus, implementations described herein are not limited to any specific combination of hardware circuitry and software.

The processor 320 of the device 300, or any other component(s) of FIG. 3 may perform one or more techniques associated with generating an interference model via crowdsourcing operations, as described in more detail elsewhere herein.

Figure 6:
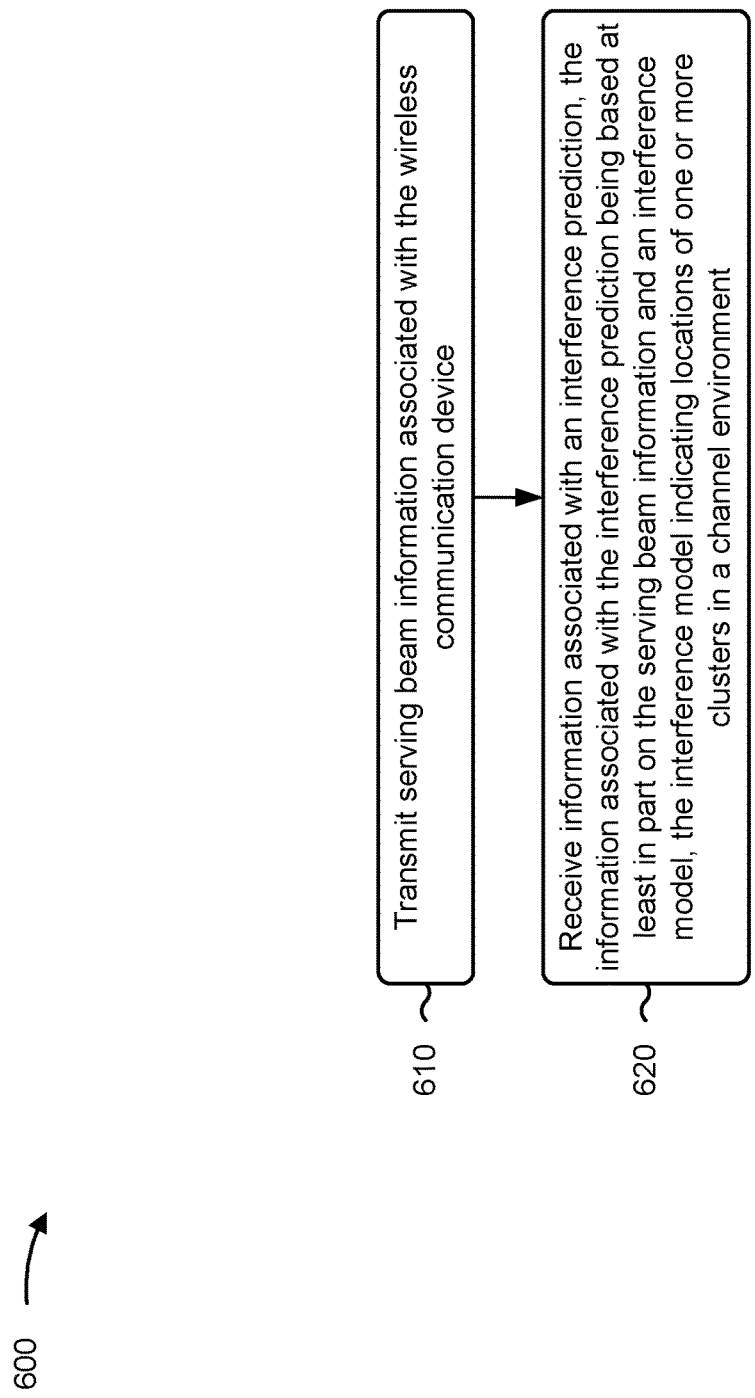
FIG. 6 is a flowchart illustrating an example process performed, for example, by a wireless communication device that supports generating an interference model via crowdsourcing operations in accordance with the present disclosure.

For example, the processor 320 of the device 300, or any other component(s) of FIG. 3 may perform or direct operations of, for example, process 600 of FIG. 6, or other processes as described herein. The memory 330 may store data and program codes for the device 300. In some examples, the memory 330 may include a non-transitory computer-readable medium storing one or more instructions (for example, code or program code). For example, the one or more instructions, when executed (for example, directly, or after compiling, converting, or interpreting) by the processor 320 of the device 300, may cause the processor 320 to perform or direct operations of, for example, process 600 of FIG. 6, or other processes as described herein. In some examples, executing instructions may include running the instructions, converting the instructions, compiling the instructions, or interpreting the instructions, among other examples.

In some aspects, the device 300 includes means for receiving serving beam information associated with a plurality of wireless communication devices; means for generating an interference model based at least in part on the serving beam information associated with the plurality of wireless communication devices, the interference model indicating locations of one or more clusters in a channel environment; means for obtaining, using the interference model, information associated with an interference prediction for a transmitting wireless communication device; or means for transmitting the information associated with the interference prediction to the transmitting wireless communication device. In some aspects, the means for the device 300 to perform operations described herein may include, for example, one or more of communication manager 170, processor 320, memory 330, input component 340, output component 350, or communication component 360.

A wireless communication system may use millimeter wave carrier frequencies for wireless communication. Millimeter wave carrier frequencies typically use large antenna arrays (for example, often more than 64 antenna elements at a network node). As carrier frequencies used for wireless communication increase (for example, into the millimeter wave region and beyond, such as frequency range 4 (FR4) or frequency range 5 (FR5)), even more antennas elements may be used at both network nodes and UEs.

Further, a wireless communication system, particularly a wireless communication system that utilizes a carrier frequency at or above the millimeter wave range, may include one or more other types of wireless communication devices, such as repeaters, relays, intelligent reflecting surface (IRS) nodes, or integrated access and backhaul (IAB) nodes), among other examples. The inclusion of these other types of wireless communication devices in the wireless communication system increases a density of wireless communication devices within the wireless communication system.

As the quantity of antenna elements at UEs and network nodes increases, and as density of wireless communication devices in a wireless communication system increases, interference can become problematic. For example, signals generated by UEs, network nodes, or other types of nodes in the wireless communication system can cause interference within the wireless communication system (for example, among wireless communication devices of the wireless communication system), thereby reducing performance and reliability of the wireless communication system.

Further, wireless communication device may utilize an intermediate frequency (IF) that is at or near frequency range 3 (FR3). Another service, such as a satellite service, that coexists in a channel environment of the wireless communication system may also utilize one or more frequencies in FR3. Therefore, signals generated by UEs, network nodes, or other types of nodes in the wireless communication system can cause interference to another service that coexists in the channel environment. In general, interference to coexisting services (for example, satellite services or aviation-related services) is problematic at a frequency range 2 (FR2) and beyond. Notably, prior techniques for addressing the issue of interference to coexisting services are costly, difficult to deploy, fail to prevent coverage holes, or are otherwise burdensome on a network operation.

Various aspects relate generally to generating an interference model via crowdsourcing operations. Some aspects more specifically relate to generation of an interference model from crowdsourcing information from multiple wireless communication devices (for example, UEs or network nodes), and utilization of the interference model to mitigate or reduce interference in or caused by a wireless communication system. In some aspects, an interference sensor may receive serving beam information associated with a plurality of wireless communication devices (for example, one or more UEs or one or more network nodes), and may generate an interference model based at least in part on the serving beam information associated with the plurality of wireless communication devices. In some aspects, the interference model indicates locations of one or more clusters in a channel environment. In some aspects, the interference sensor may obtain, using the interference model, information associated with an interference prediction for a transmitting wireless communication device (for example, a particular UE or network node) and may transmit the information associated with the interference prediction to the transmitting wireless communication device. The transmitting wireless communication device may in some aspects adjust one or more transmission parameters (for example, a transmission power, a beam, or a beam direction, among other examples) based at least in part on the information associated with the interference prediction.

Particular aspects of the subject matter described in this disclosure can be implemented to realize one or more of the following potential advantages. In some examples, the described techniques can be used to reduce or mitigate interference within or caused by a wireless communication system by enabling the interference sensor to predict interference that would be caused by a given wireless communication device. For example, the described techniques can be used reduce or mitigate interference caused by the given wireless communication device to one or more other wireless communication devices in the wireless communication system. In this way, performance and reliability of wireless communication in the wireless communication system can be improved. As another example, the described techniques can be used reduce or mitigate interference caused by a given wireless communication device to a coexisting service in the channel environment. In this way, interference to the coexisting service in a channel environment can be reduced or mitigated, thereby reducing an impact of the wireless communication device on the coexisting service.

Figure 4A:
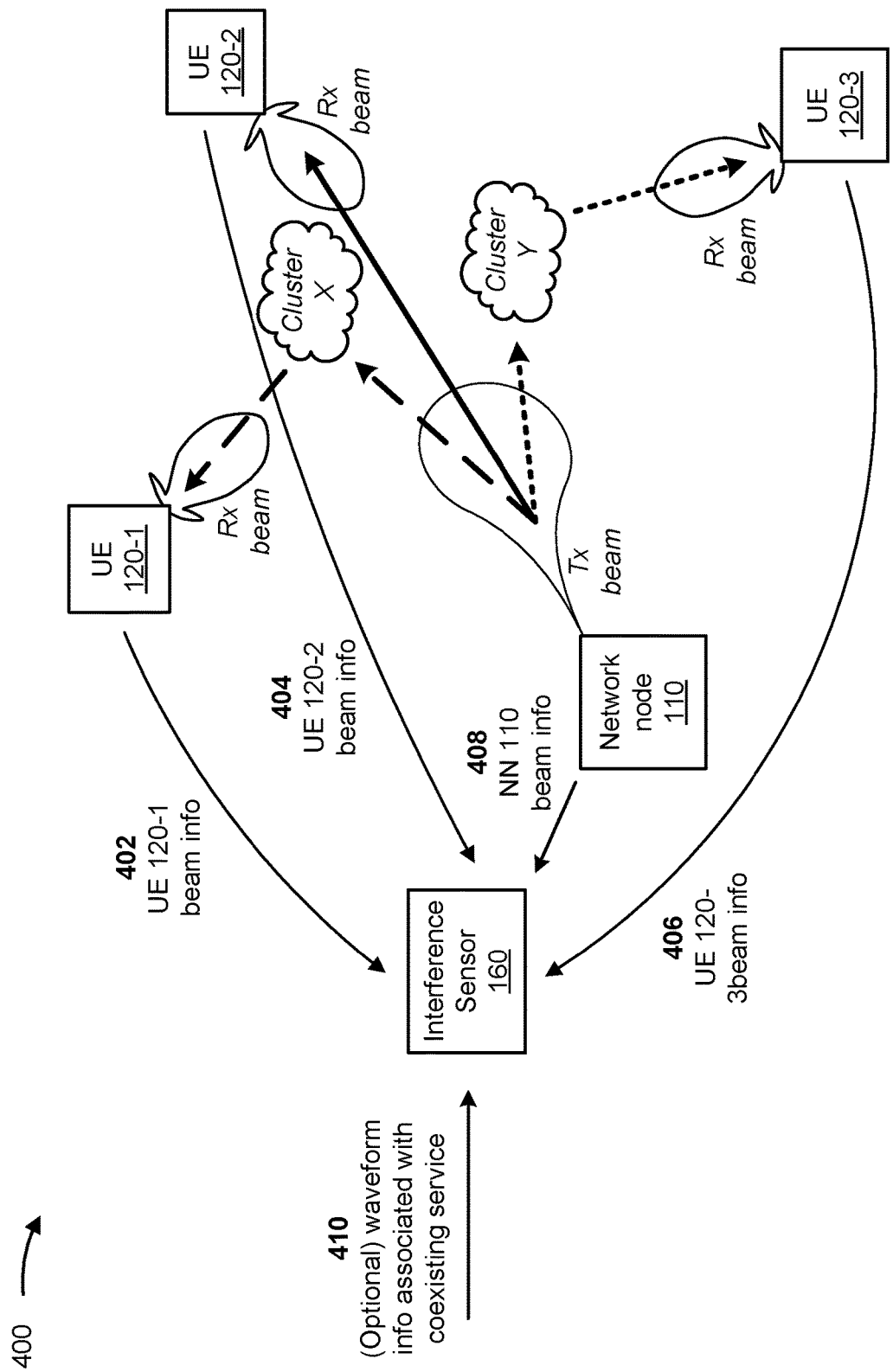
FIGS. 4A and 4B are diagrams illustrating an example associated with generating an interference model via crowdsourcing operations in accordance with the present disclosure.
Figure 4B:
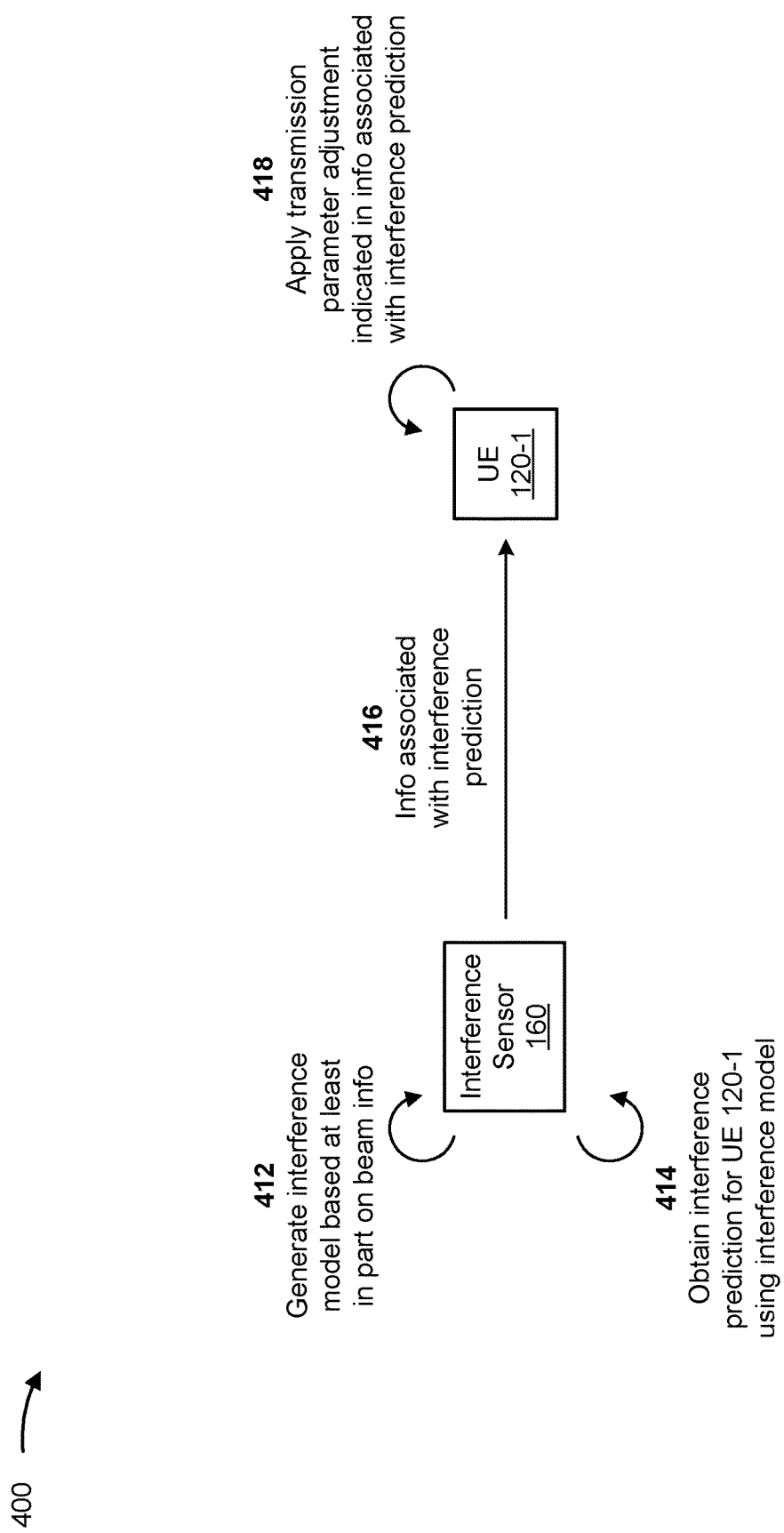

FIGS. 4A and 4B are diagrams illustrating an example 400 associated with generating an interference model via crowdsourcing operations in accordance with the present disclosure. As shown in FIGS. 4A and 4B, example 400 includes communication between an interference sensor 160, one or more UEs 120 (for example, UEs 120-1 through 120-3), and one or more network nodes 110. In some aspects, the interference sensor 160, the one or more network nodes 110, or the one or more UEs 120 may be included in a wireless network, such as wireless network 100.

As shown in FIG. 4A, the interference sensor 160 may in some aspects receive serving beam information associated with a plurality of wireless communication devices. For example, as shown in FIG. 4A, in a first operation 402, a UE 120-1 may transmit, and the interference sensor 160 may receive, serving beam information associated with the UE 120-1. Similarly, in a second operation 404, a UE 120-2 may transmit, and the interference sensor 160 may receive, serving beam information associated with the UE 120-2. Further, in a third operation 406, a UE 120-3 may transmit, and the interference sensor 160 may receive, serving beam information associated with the UE 120-3. Additionally, in a fourth operation 408, a network node 110 may transmit, and the interference sensor 160 may receive, serving beam information associated with the network node 110. The serving beam information includes information associated with one or more beams configured for use by the one or more wireless communication devices (for example, one or more beams to be used for receiving wireless communications or one or more beams to be used for transmitting wireless communications).

In some aspects, the serving beam information includes beam information associated with a receiving wireless communication device (for example, the serving beam information received from UE 120-1, UE 120-2, and UE 120-3 in example 400). For example, in some aspects, the serving beam information may indicate a signal strength associated with a signal received using a receive beam (for example, an RSRP of a signal received using a receive beam, where a strength of the signal satisfies a threshold). As another example, the serving beam information device may indicate a location of the receiving wireless communication device (for example, an approximate location of the receiving wireless communication device on a global coordinate system). As another example, the serving beam information may indicate a direction of the receive beam (for example, a direction of receive beam steering on the global coordinate system). As another example, the serving beam information may indicate whether the receiving wireless communication device has (or has not) detected any signal using the receive beam. In some aspects, serving beam information associated with the receiving wireless communication device may include serving beam information associated with one or more receive beams configured for use by the receiving wireless communication device.

In some aspects, the serving beam information includes beam information associated with a transmitting wireless communication device (for example, the serving beam information received from the network node 110 in example 400). For example, in some aspects, the serving beam information may indicate a location of the transmitting wireless communication device (for example, an approximate location of the transmitting wireless communication device on the global coordinate system). As another example, the serving beam information may indicate a direction of the transmit beam (for example, a direction of transmit beam steering on the global coordinate system). In some aspects, serving beam information associated with the transmitting wireless communication device may include serving beam information associated with one or more transmit beams configured for use by the transmitting wireless communication device.

In some aspects, a given wireless communication device (for example, a UE 120 or a network node 110) can be a receiving wireless communication device and a transmitting wireless communication device. For example, a given UE 120 is a receiving wireless communication device when receiving downlink communications from the network node 110 (for example, as illustrated in FIG. 4A) or receiving sidelink communications from another UE 120, and is a transmitting wireless communication device when transmitting uplink communications to the network node 110 or transmitting sidelink communications to another UE 120. Similarly, the network node 110 is a transmitting wireless communication device when transmitting downlink communications to one or more UEs 120 (for example, as illustrated in FIG. 4A), and is a receiving wireless communication device when receiving uplink communications from one or more UEs 120. In some aspects, the serving beam information received from a given wireless communication device may include information associated with receive beams and information associated with transmit beams configured for use by the given wireless communication device.

In some aspects, the interference sensor 160 may receive multiple items of serving beam information associated with a given wireless communication device. For example, the interference sensor 160 may receive serving beam information associated with the first UE 120-1 at a first time (for example, serving beam information associated with beams configured for use by the UE 120-1 at a first point in time). The interference sensor 160 may then receive second serving beam information associated with the first UE 120-1 at a second (later) time (for example, serving beam information associated with one or more beams configured for use by the UE 120-2 at a second point in time). In this way, the interference sensor 160 may maintain updated serving beam information associated with a given wireless communication device. This allows the interference sensor 160 to maintain an updated interference model over time (for example, as beam configurations of wireless communication devices change over time), as described in further detail below.

In some aspects, the interference sensor 160 may receive the serving beam information (automatically) on a periodic basis (for example, when a given wireless communication device is configured transmit serving beam information at a particular time interval). Additionally or alternatively, the interference sensor 160 may receive the serving beam information based at least in part on requesting the serving beam information from a given wireless communication device. Additionally or alternatively, the interference sensor 160 may receive the serving beam information based at least in part on a change to the serving beam information (for example, when a given wireless communication device is configured transmit updated serving beam information to the interference sensor 160 each time the serving beam information is updated or adjusted).

In some aspects, in an optional fifth operation 410, the interference sensor 160 may determine waveform information associated with a coexisting service in a channel environment of the wireless communication devices. The coexisting service may include, for example, a satellite service, an aviation-related service (for example, a radio altimeter service), a service that utilizes a C-band frequency, or another type of wireless communication service that operates in an environment at or near the plurality of wireless communication devices. In some aspects, the waveform information includes information indicating one or more characteristics of a waveform (for example, a frequency) of a signal associated with the coexisting service. In some aspects, the interference sensor 160 may determine the waveform information based at least in part on receiving the waveform information from a database, accessible by the interference sensor 160, that stores waveform information associated with one or more coexisting services.

As shown in FIG. 4B, in a sixth operation 412, the interference sensor 160 may generate an interference model based at least in part on the serving beam information associated with the plurality of wireless communication devices. The interference model is a model that indicates locations of one or more clusters in the channel environment of the plurality of wireless communication devices. A cluster is a channel modeling terminology that captures a propagation mode between a transmitting wireless communication device and a receiving wireless communication device. For example, a cluster could capture reflection of propagated energy from the transmitting wireless communication device via an object in the channel environment, such as a glass object, a metallic object, or a human, among other examples. Alternately, in the absence of a physical entity that captures the reflection of propagated electromagnetic waves, the notion of a cluster serves as a virtual partition of a beam space over which energy is propagated. In some aspects, the interference sensor 160 may generate the interference model based at least in part on the serving beam information associated with the plurality of wireless communication devices. That is, the interference sensor 160 may model the channel environment based at least in part on the serving beam information. In some aspects, the interference sensor 160 may utilize a machine learning technique or another type of artificial intelligence technique in association with generating the interference model.

In some aspects, generating the interference model may include updating the interference model. For example, the interference sensor 160 may generate the interference model based at least in part on first serving beam information received from a plurality of wireless communication devices. The interference sensor 160 may then (at a later time) receive second (for example, updated, additional, or different) serving beam information from one or more wireless communication devices of the plurality of wireless communication devices. The interference sensor 160 may then update or retrain the interference model based at least in part on the second serving beam information and, in this way, may maintain an updated interference model.

In some aspects, the interference sensor 160 may generate the interference model further based at least in part on the waveform information associated with the coexisting service. That is, in some aspects, the interference sensor 160 may model the channel environment based at least in part on the waveform information associated with the coexisting service. In this way, the signal associated with the coexisting service can be taken into account by the interference model (for example, such that an interference prediction that is output by the interference model indicates whether a given wireless communication device could cause interference to the coexisting service).

In some aspects, the interference sensor 160 may generate the interference model further based at least in part on an interference report received by the interference sensor 160. For example, a wireless communication device (for example, a UE 120) may transmit, and the interference sensor 160 may receive, an interference report indicating whether the wireless communication device has detected interference from one or more signals, and the interference sensor 160 may generate the interference model based at least in part on the signal as detected (or not detected) by the wireless communication device.

In some aspects, the interference sensor 160 may transmit, and a wireless communication device may receive, parameter information associated with the one or more signals. In some aspects, the parameter information includes information that improves or enables detection of the one or more signals by the wireless communication device. The parameter information may include, for example, a frequency band associated with a signal, a time-frequency characteristic of the signal, a spatial characteristic of the signal (for example, wide beam, narrow beam, or periodic beam), among other examples. In some aspects, detection based on such parameter information may enable higher sensitivity of the wireless communication device in association with detecting the signal.

In some aspects, a wireless communication device may transmit, and the interference sensor 160 may receive, capability information indicating whether the wireless communication device is capable of performing signal detection associated with generating the interference report (for example, whether the wireless communication device is capable of detection while operating in RRC idle mode or in RRC connected mode).

In some aspects, the interference report indicates whether the wireless communication device has detected a given signal of the one or more signals. For example, the interference report may indicate that the wireless communication device has detected a particular signal. Alternatively, the interference report may indicate that the wireless communication device has not detected a particular signal. In some aspects, the interference report may indicate one or more characteristics associated with a signal detected by the wireless communication device, such as a signal strength, a time domain resource associated with the detected signal (for example, an indication of a time domain resource in which the signal was detected), a frequency domain resource associated with the detected signal (for example, an indication of a frequency domain resource in which the signal was detected), or a spatial characteristic of the detected signal (for example, an indication of a direction in which the signal was detected), among other examples.

In some aspects, the interference report indicates an energy map that has a time dimension, a frequency dimension, or a spatial dimension. For example, the interference report may be a three-dimensional (3D) interference map that maps a detected signal in time, frequency, and space. In some aspects, a granularity of a given dimension may be adapted by the wireless communication device autonomously or may be configured by the network.

In some aspects, a given wireless communication device may compress the interference report prior to transmitting the interference report. Thus, in some aspects, the interference report received by the interference sensor 160 may be a compressed interference report. In some aspects, the wireless communication device may compress the interference report according to fixed codebook or an adaptable codebook. In some aspects, for an adaptable codebook, wireless communication devices may be configured with a finite set of code words or, alternatively, the set of code words may be unconstrained. In some aspects, the wireless communication device may utilize unconstrained compression when, for example, the wireless communication device find sufficient gain to enable unconstrained compression. In some aspects, codeword adaptation and unconstrained compression can be determined by a neural network at the wireless communication device or using federated learning techniques at the wireless communication device.

In some aspects, the one or more signals associated with the interference report may be associated with one or more coexisting services in the channel environment. That is, an interference report provided by a given wireless communication device may indicate that the given wireless communication device has (or has not) detected a signal associated with a coexisting service. In some aspects, the use of such information may improve the interference model by enabling the interference model to be generated based at least in part on signals associated with coexisting services that are actually detected (or not detected) by one or more wireless communication devices.

In a seventh operation 414, the interference sensor 160 may obtain, using the interference model, information associated with an interference prediction for a transmitting wireless communication device. Notably, in FIG. 4B, the UE 120-1 is indicated as the transmitting wireless communication device (as would be the case when the UE 120-1 transmitting an uplink communication to the network node 110).

In some aspects, the interference sensor 160 may provide serving beam information associated with the transmitting wireless communication device as an input to the interference model and may receive the information associated with the interference prediction as an output of the interference model. In some aspects, the serving beam information provided as the input to the interference model may be received by the interference sensor 160 in a manner similar to that described above with respect to operations 402-408.

In some aspects, the information associated with the interference prediction indicates whether the transmitting wireless communication device would cause interference by using a beam identified in the serving beam information associated with the transmitting wireless communication device. That is, the information associated with the interference prediction may indicate information associated with interference that could be caused if the transmitting wireless communication device were to use a transmit beam indicated in the beam information associated with the transmitting wireless communication device.

In some aspects, the information associated with the interference prediction indicates one or more transmission parameter adjustments to be applied by the transmitting wireless communication device (for example, to reduce or mitigate interference caused by the transmitting wireless communication device). In some aspects, the one or more transmission parameter adjustments may include a transmission power adjustment (for example, an indication of a transmit power to be used by the transmitting wireless communication device or an indication of an amount by which to reduce the transmit power). Additionally or alternatively, the one or more transmission parameter adjustments may include a beam change (for example, an indication to switch to a different beam for transmitting). Additionally or alternatively, the one or more transmission parameter adjustments may include a beam direction change (for example, an indication of a beam direction or an indication of an amount by which to change the beam direction).

In some aspects, the information associated with the interference prediction indicates whether the transmitting wireless communication device would cause interference to the coexisting service by using a beam identified in the serving beam information associated with the transmitting wireless communication device. For example, if the interference model is generated based at least in part on waveform information associated with the coexisting service, then the information associated with the interference prediction may include an indication of whether the transmitting wireless communication device could cause interference to the coexisting service using a beam indicated in the beam information associated with the transmitting wireless communication device.

In an eighth operation 416, the interference sensor 160 may transmit, and a transmitting wireless communication device may receive, the information associated with the interference prediction.

In a ninth operation 418, the transmitting wireless communication device may apply the one or more transmission parameter adjustments indicated in the information associated with the interference prediction (for example, to reduce or mitigate interference that would be caused by the transmitting wireless communication device).

In this way, interference caused by the transmitting wireless communication device (for example, to other wireless communication devices in the wireless communication system or to one or more coexisting services) can be reduced or mitigated. Further advantages provided by the interference model can include enabling improvement in RF planning and network operation, enabling detection of a violation of spectrum use, enabling determination or verification of whether a given wireless communication device is providing coverage as intended (for example, in a distributed network deployment), or enabling parametric or semi-parametric characterization of interference.

FIG. 5 is a flowchart illustrating an example process 500 performed, for example, by an interference sensor that supports generating an interference model via crowdsourcing operations in accordance with the present disclosure. Example process 500 is an example where the interference sensor (for example, interference sensor 160) performs operations associated with generating an interference model via crowdsourcing operations.

As shown in FIG. 5, in some aspects, process 500 may include receiving serving beam information associated with a plurality of wireless communication devices (block 510). For example, the interference sensor (such as by using communication manager 170 or reception component 702, depicted in FIG. 7) may receive serving beam information associated with a plurality of wireless communication devices, as described above.

As further shown in FIG. 5, in some aspects, process 500 may include generating an interference model based at least in part on the serving beam information associated with the plurality of wireless communication devices, the interference model indicating locations of one or more clusters in a channel environment (block 520). For example, the interference sensor (such as by using communication manager 170 or interference model component 708, depicted in FIG. 7) may generate an interference model based at least in part on the serving beam information associated with the plurality of wireless communication devices, the interference model indicating locations of one or more clusters in a channel environment, as described above.

As further shown in FIG. 5, in some aspects, process 500 may include obtaining, using the interference model, information associated with an interference prediction for a transmitting wireless communication device (block 530). For example, the interference sensor (such as by using communication manager 170 or interference model component 708, depicted in FIG. 7) may obtain, using the interference model, information associated with an interference prediction for a transmitting wireless communication device, as described above.

As further shown in FIG. 5, in some aspects, process 500 may include transmitting the information associated with the interference prediction to the transmitting wireless communication device (block 540). For example, the interference sensor (such as by using communication manager 170 or transmission component 704, depicted in FIG. 7) may transmit the information associated with the interference prediction to the transmitting wireless communication device, as described above.

Process 500 may include additional aspects, such as any single aspect or any combination of aspects described below or in connection with one or more other processes described elsewhere herein.

In a first additional aspect, the plurality of wireless communication devices includes a receiving wireless communication device, and the serving beam information includes information indicating at least one of a signal strength associated with a receive beam used by the receiving wireless communication device, a location of the receiving wireless communication device, or a direction of the receive beam used by the receiving wireless communication device.

In a second additional aspect, alone or in combination with the first aspect, the plurality of wireless communication devices includes another transmitting wireless communication device, and the serving beam information includes information indicating at least one of a location of the other transmitting wireless communication device, or a direction of a transmit beam used by the other transmitting wireless communication device.

In a third additional aspect, alone or in combination with one or more of the first and second aspects, obtaining the information associated with interference prediction comprises providing serving beam information associated with the transmitting wireless communication device as an input to the interference model, and receiving the information associated with the interference prediction as an output of the interference model, the information associated with the interference prediction indicating whether the transmitting wireless communication device would cause interference by using a beam identified in the serving beam information associated with the transmitting wireless communication device.

In a fourth additional aspect, alone or in combination with one or more of the first through third aspects, process 500 includes determining waveform information associated with a coexisting service in the channel environment, wherein the generation of the interference model is further based at least in part on the waveform information associated with the coexisting service.

In a fifth additional aspect, alone or in combination with one or more of the first through fourth aspects, the information associated with the interference prediction indicates whether the transmitting wireless communication device would cause interference to the coexisting service by using a beam identified in serving beam information associated with the transmitting wireless communication device.

In a sixth additional aspect, alone or in combination with one or more of the first through fifth aspects, the information associated with the interference prediction indicates one or more transmission parameter adjustments to be applied by the transmitting wireless communication device.

In a seventh additional aspect, alone or in combination with one or more of the first through sixth aspects, the one or more transmission parameter adjustments include at least one of a transmission power adjustment, a beam change, or a beam direction change.

In an eighth additional aspect, alone or in combination with one or more of the first through seventh aspects, process 500 includes receiving an interference report from a wireless communication device of the plurality of wireless communication devices, the interference report indicating whether the wireless communication device has detected interference from one or more signals, wherein the generation of the interference model is further based at least in part on the interference report.

In a ninth additional aspect, alone or in combination with one or more of the first through eighth aspects, the one or more signals are associated with a coexisting service in the channel environment.

In a tenth additional aspect, alone or in combination with one or more of the first through ninth aspects, the interference report indicates at least one of that the wireless communication device has detected or has not detected a signal of the one or more signals, a signal strength of the signal, a time domain resource associated with the signal, a frequency domain resource associated with the signal, or a spatial characteristic of the signal.

In an eleventh additional aspect, alone or in combination with one or more of the first through tenth aspects, process 500 includes transmitting parameter information associated with the one or more signals to the wireless communication device.

In a twelfth additional aspect, alone or in combination with one or more of the first through eleventh aspects, process 500 includes receiving capability information indicating that the wireless communication device is capable of performing signal detection associated with generating the interference report.

In a thirteenth additional aspect, alone or in combination with one or more of the first through twelfth aspects, the interference report indicates an energy map having at least one of a time dimension, a frequency dimension, or a spatial dimension.

FIG. 6 is a flowchart illustrating an example process 600 performed, for example, by a wireless communication device that supports generating an interference model via crowdsourcing operations in accordance with the present disclosure. Example process 600 is an example where the wireless communication device (for example, a UE 120 or a network node 110) performs operations associated with generating an interference model via crowdsourcing operations.

As shown in FIG. 6, in some aspects, process 600 may include transmitting serving beam information associated with the wireless communication device (block 610). For example, the wireless communication device (such as by using communication manager 140, communication manager 150, or transmission component 804, depicted in FIG. 8) may transmit serving beam information associated with the wireless communication device, as described above.

As further shown in FIG. 6, in some aspects, process 600 may include receiving information associated with an interference prediction, the information associated with the interference prediction being based at least in part on the serving beam information and an interference model, the interference model indicating locations of one or more clusters in a channel environment (block 620). For example, the wireless communication device (such as by using communication manager 140, communication manager 150, or reception component 802, depicted in FIG. 8) may receive information associated with an interference prediction, the information associated with the interference prediction being based at least in part on the serving beam information and an interference model, the interference model indicating locations of one or more clusters in a channel environment, as described above.

Process 600 may include additional aspects, such as any single aspect or any combination of aspects described below or in connection with one or more other processes described elsewhere herein.

In a first additional aspect, the serving beam information includes information indicating at least one of a signal strength associated with a receive beam used by the wireless communication device, a location of the wireless communication device, a direction of the receive beam used by the wireless communication device, or a direction of a transmit beam used by the wireless communication device.

In a second additional aspect, alone or in combination with the first aspect, the information associated with the interference prediction indicates one or more transmission parameter adjustments to be applied by the wireless communication device.

In a third additional aspect, alone or in combination with one or more of the first and second aspects, the one or more transmission parameter adjustments include at least one of a transmission power adjustment, a beam change, or a beam direction change.

In a fourth additional aspect, alone or in combination with one or more of the first through third aspects, process 600 includes transmitting an interference report indicating interference from one or more signals detected by the wireless communication device.

In a fifth additional aspect, alone or in combination with one or more of the first through fourth aspects, the one or more signals are associated with a coexisting service in the channel environment.

In a sixth additional aspect, alone or in combination with one or more of the first through fifth aspects, the interference report indicates at least one of that the wireless communication device has or has not detected a signal of the one or more signals, a signal strength of the signal, a time domain resource associated with the signal, a frequency domain resource associated with the signal, or a spatial characteristic of the signal.

In a seventh additional aspect, alone or in combination with one or more of the first through sixth aspects, process 600 includes receiving parameter information associated with the one or more signals.

In an eighth additional aspect, alone or in combination with one or more of the first through seventh aspects, process 600 includes transmitting capability information indicating that the wireless communication device is capable of performing signal detection associated with generating the interference report.

In a ninth additional aspect, alone or in combination with one or more of the first through eighth aspects, the interference report indicates an energy map having at least one of a time dimension, a frequency dimension, or a spatial dimension.

In a tenth additional aspect, alone or in combination with one or more of the first through ninth aspects, process 600 includes compressing the interference report according to fixed codebook or an adaptable codebook.

Figure 7:
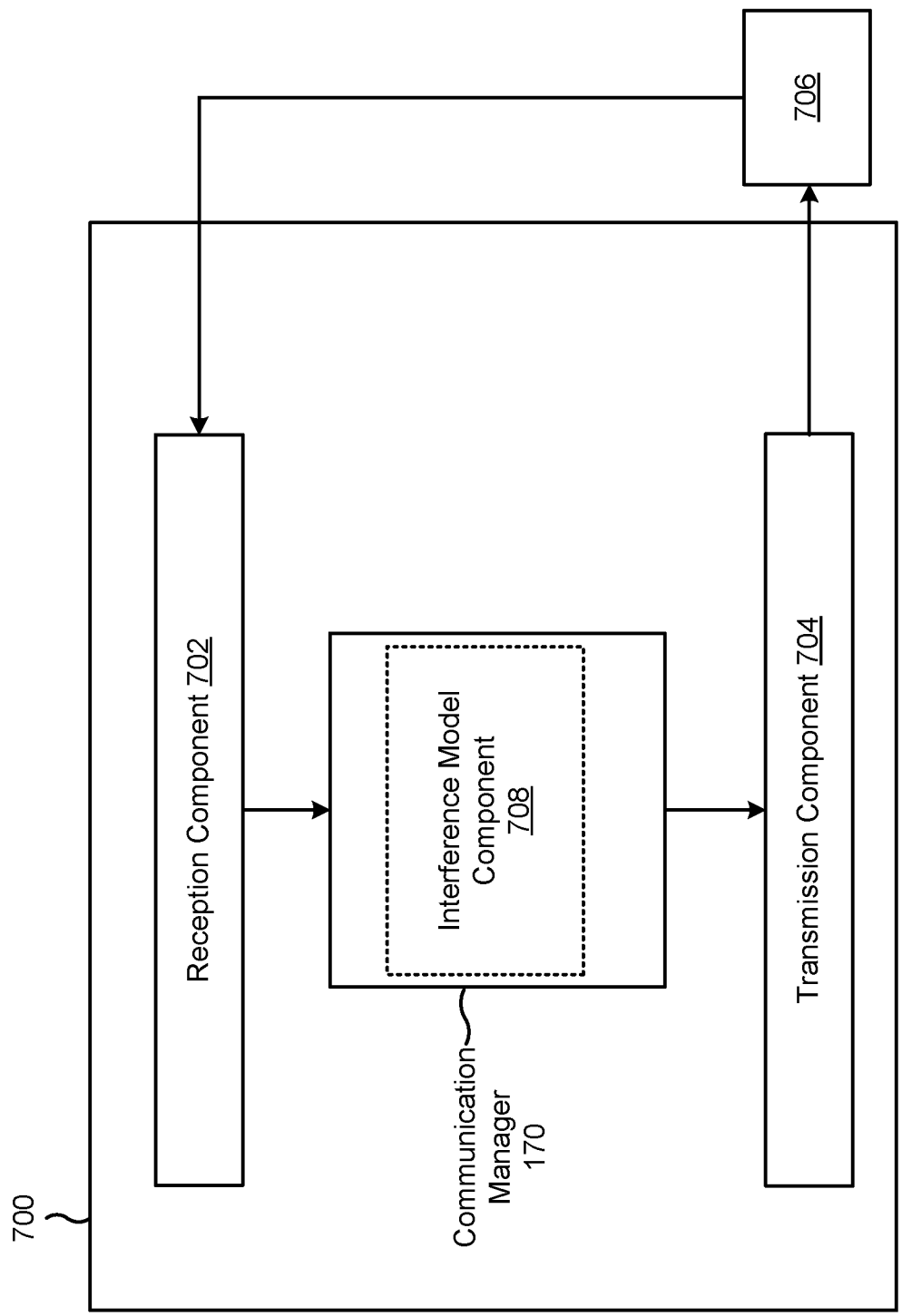
FIGS. 7 and 8 are diagrams of example apparatuses for wireless communication that support generating an interference model via crowdsourcing operations in accordance with the present disclosure.

FIG. 7 is a diagram of an example apparatus 700 for wireless communication that supports generating an interference model via crowdsourcing operations in accordance with the present disclosure. The apparatus 700 may be an interference sensor, or an interference sensor may include the apparatus 700. In some aspects, the apparatus 700 includes a reception component 702, a transmission component 704, and a communication manager 170, which may be in communication with one another (for example, via one or more buses). As shown, the apparatus 700 may communicate with another apparatus 706 (such as a UE, a network node, or another wireless communication device) using the reception component 702 and the transmission component 704.

In some aspects, the apparatus 700 may be configured to perform one or more operations described herein in connection with FIGS. 4A and 4B. Additionally or alternatively, the apparatus 700 may be configured to perform one or more processes described herein, such as process 500 of FIG. 5. In some aspects, the apparatus 700 may include one or more components of the interference sensor described above in connection with FIG. 2.

The reception component 702 may receive communications, such as reference signals, control information, data communications, or a combination thereof, from the apparatus 706. The reception component 702 may provide received communications to one or more other components of the apparatus 700, such as the communication manager 170. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 702 may include one or more antennas, a modem, a demodulator, a MIMO detector, a receive processor, a controller/processor, a memory, or a combination thereof, of the interference sensor described above in connection with FIG. 2.

The transmission component 704 may transmit communications, such as reference signals, control information, data communications, or a combination thereof, to the apparatus 706. In some aspects, the communication manager 170 may generate communications and may transmit the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the interference sensor described above in connection with FIG. 2. In some aspects, the transmission component 704 may be co-located with the reception component 702 in a transceiver.

The communication manager 170 may receive or may cause the reception component 702 to receive serving beam information associated with a plurality of wireless communication devices. The communication manager 170 may generate an interference model based at least in part on the serving beam information associated with the plurality of wireless communication devices, the interference model indicating locations of one or more clusters in a channel environment. The communication manager 170 may obtain, using the interference model, information associated with an interference prediction for a transmitting wireless communication device. The communication manager 170 may transmit or may cause the transmission component 704 to transmit the information associated with the interference prediction to the transmitting wireless communication device. In some aspects, the communication manager 170 may perform one or more operations described elsewhere herein as being performed by one or more components of the communication manager 170.

The communication manager 170 may include a controller/processor, a memory, or a combination thereof, of the interference sensor described above in connection with FIG. 3. In some aspects, the communication manager 170 includes a set of components, such as an interference model component 708. Alternatively, the set of components may be separate and distinct from the communication manager 170. In some aspects, one or more components of the set of components may include or may be implemented within a controller/processor, a memory, or a combination thereof, of the interference sensor described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive serving beam information associated with a plurality of wireless communication devices. The interference model component 708 may generate an interference model based at least in part on the serving beam information associated with the plurality of wireless communication devices, the interference model indicating locations of one or more clusters in a channel environment. The interference model component 708 may obtain, using the interference model, information associated with an interference prediction for a transmitting wireless communication device. The transmission component 704 may transmit the information associated with the interference prediction to the transmitting wireless communication device.

The interference model component 708 may determine waveform information associated with a coexisting service in the channel environment, wherein the generation of the interference model is further based at least in part on the waveform information associated with the coexisting service.

The reception component 702 may receive an interference report from a wireless communication device of the plurality of wireless communication devices, the interference report indicating whether the wireless communication device has detected interference from one or more signals, wherein the generation of the interference model is further based at least in part on the interference report.

The transmission component 704 may transmit parameter information associated with the one or more signals to the wireless communication device.

The reception component 702 may receive capability information indicating that the wireless communication device is capable of performing signal detection associated with generating the interference report.

Figure 8:
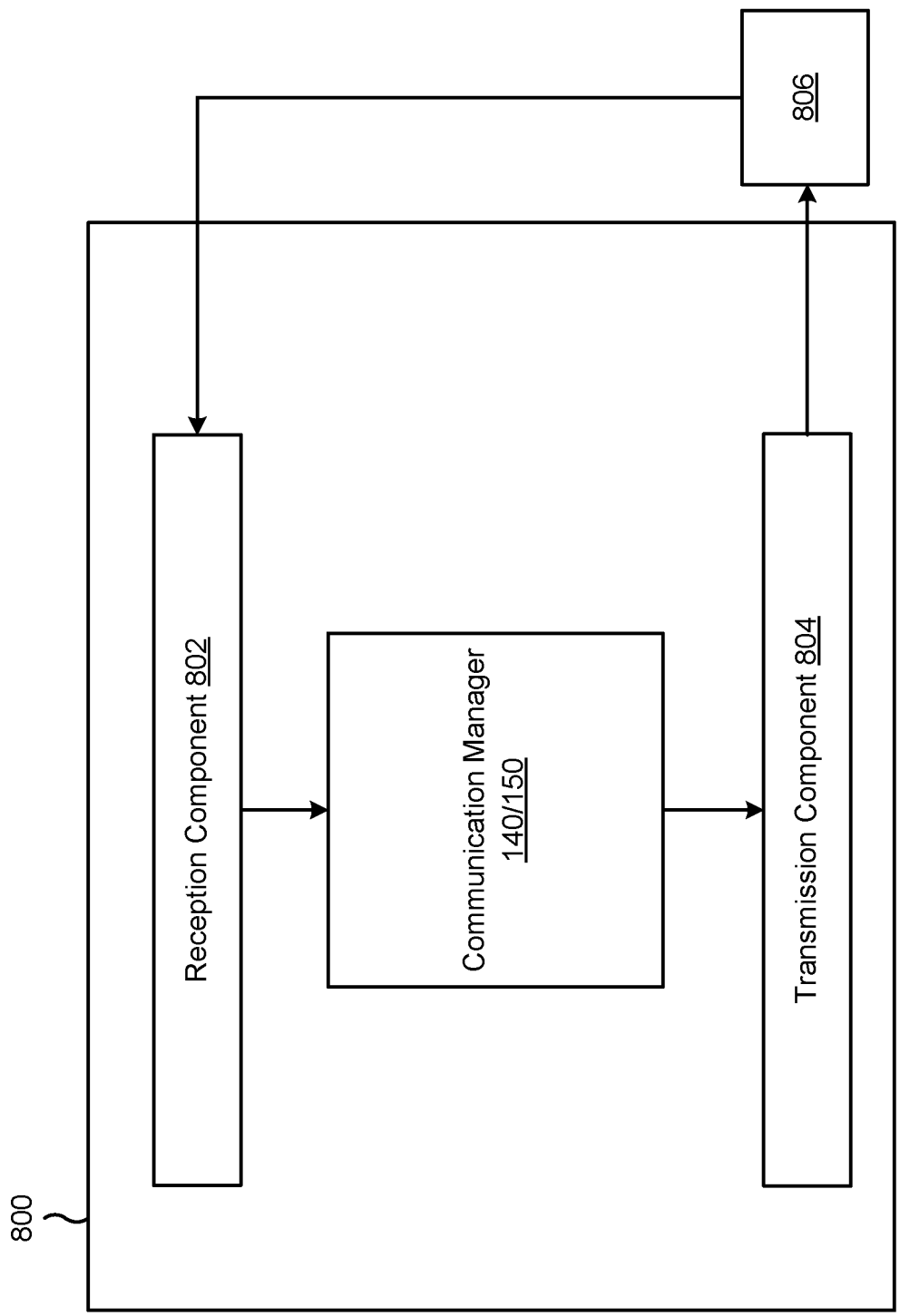

FIG. 8 is a diagram of an example apparatus 800 for wireless communication that supports generating an interference model via crowdsourcing operations in accordance with the present disclosure. The apparatus 800 may be a wireless communication device (for example, a UE or a network node), or a wireless communication device may include the apparatus 800. In some aspects, the apparatus 800 includes a reception component 802, a transmission component 804, and a communication manager 140 (for example, if the apparatus 800 is a UE) or a communication manager 150 (for example, when the apparatus 800 is a network node), which may be in communication with one another (for example, via one or more buses). As shown, the apparatus 800 may communicate with another apparatus 806 (such as an interference sensor, UE, a network node, or another wireless communication device) using the reception component 802 and the transmission component 804.

In some aspects, the apparatus 800 may be configured to perform one or more operations described herein in connection with FIGS. 4A and 4B. Additionally or alternatively, the apparatus 800 may be configured to perform one or more processes described herein, such as process 600 FIG. 6. In some aspects, the apparatus 800 may include one or more components of the wireless communication device described above in connection with FIG. 2.

The reception component 802 may receive communications, such as reference signals, control information, data communications, or a combination thereof, from the apparatus 806. The reception component 802 may provide received communications to one or more other components of the apparatus 800, such as the communication manager 140/150. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a modem, a demodulator, a MIMO detector, a receive processor, a controller/processor, a memory, or a combination thereof, of the wireless communication device described above in connection with FIG. 2.

The transmission component 804 may transmit communications, such as reference signals, control information, data communications, or a combination thereof, to the apparatus 806. In some aspects, the communication manager 140/150 may generate communications and may transmit the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the wireless communication device described above in connection with FIG. 2. In some aspects, the transmission component 804 may be co-located with the reception component 802 in a transceiver.

The communication manager 140/150 may transmit or may cause the transmission component 804 to transmit serving beam information associated with the wireless communication device. The communication manager 140/150 may receive or may cause the reception component 802 to receive information associated with an interference prediction, the information associated with the interference prediction being based at least in part on the serving beam information and an interference model, the interference model indicating locations of one or more clusters in a channel environment. In some aspects, the communication manager 140/150 may perform one or more operations described elsewhere herein as being performed by one or more components of the communication manager 140/150.

The communication manager 140/150 may include a controller/processor, a memory, a scheduler, a communication unit, or a combination thereof, of the wireless communication device described above in connection with FIG. 2. In some aspects, the communication manager 140/150 includes a set of components. Alternatively, the set of components may be separate and distinct from the communication manager 140/150. In some aspects, one or more components of the set of components may include or may be implemented within a controller/processor, a memory, a scheduler, a communication unit, or a combination thereof, of the wireless communication device described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 804 may transmit serving beam information associated with the wireless communication device. The reception component 802 may receive information associated with an interference prediction, the information associated with the interference prediction being based at least in part on the serving beam information and an interference model, the interference model indicating locations of one or more clusters in a channel environment.

The transmission component 804 may transmit an interference report indicating interference from one or more signals detected by the wireless communication device.

The reception component 802 may receive parameter information associated with the one or more signals.

The transmission component 804 may transmit capability information indicating that the wireless communication device is capable of performing signal detection associated with generating the interference report.

The transmission component 804 may compress the interference report according to fixed codebook or an adaptable codebook.

The following provides an overview of some Aspects of the present disclosure:

Aspect 1: A method of wireless communication performed by a device, comprising: receiving serving beam information associated with a plurality of wireless communication devices; generating an interference model based at least in part on the serving beam information associated with the plurality of wireless communication devices, the interference model indicating locations of one or more clusters in a channel environment; obtaining, using the interference model, information associated with an interference prediction for a transmitting wireless communication device; and transmitting the information associated with the interference prediction to the transmitting wireless communication device.

Aspect 2: The method of Aspect 1, wherein the plurality of wireless communication devices includes a receiving wireless communication device, and the serving beam information includes information indicating at least one of: a signal strength associated with a receive beam used by the receiving wireless communication device, a location of the receiving wireless communication device, or a direction of the receive beam used by the receiving wireless communication device.

Aspect 3: The method of any of Aspects 1-2, wherein the plurality of wireless communication devices includes another transmitting wireless communication device, and the serving beam information includes information indicating at least one of: a location of the other transmitting wireless communication device, or a direction of a transmit beam used by the other transmitting wireless communication device.

Aspect 4: The method of any of Aspects 1-3, wherein obtaining the information associated with interference prediction comprises: providing serving beam information associated with the transmitting wireless communication device as an input to the interference model; and receiving the information associated with the interference prediction as an output of the interference model, the information associated with the interference prediction indicating whether the transmitting wireless communication device would cause interference by using a beam identified in the serving beam information associated with the transmitting wireless communication device.

Aspect 5: The method of any of Aspects 1-4, further comprising: determining waveform information associated with a coexisting service in the channel environment, wherein the generation of the interference model is further based at least in part on the waveform information associated with the coexisting service.

Aspect 6: The method of Aspect 5, wherein the information associated with the interference prediction indicates whether the transmitting wireless communication device would cause interference to the coexisting service by using a beam identified in serving beam information associated with the transmitting wireless communication device.

Aspect 7: The method of any of Aspects 1-6, wherein the information associated with the interference prediction indicates one or more transmission parameter adjustments to be applied by the transmitting wireless communication device.

Aspect 8: The method of Aspect 7, wherein the one or more transmission parameter adjustments include at least one of a transmission power adjustment, a beam change, or a beam direction change.

Aspect 9: The method of any of Aspects 1-8, further comprising: receiving an interference report from a wireless communication device of the plurality of wireless communication devices, the interference report indicating whether the wireless communication device has detected interference from one or more signals, wherein the generation of the interference model is further based at least in part on the interference report.

Aspect 10: The method of Aspect 9, wherein the one or more signals are associated with a coexisting service in the channel environment.

Aspect 11: The method of any of Aspects 9-10, wherein the interference report indicates at least one of: that the wireless communication device has detected or has not detected a signal of the one or more signals, a signal strength of the signal, a time domain resource associated with the signal, a frequency domain resource associated with the signal, or a spatial characteristic of the signal.

Aspect 12: The method of any of Aspects 9-11, further comprising transmitting parameter information associated with the one or more signals to the wireless communication device.

Aspect 13: The method of any of Aspects 9-12, further comprising receiving capability information indicating that the wireless communication device is capable of performing signal detection associated with generating the interference report.

Aspect 14: The method of any of Aspects 9-13, wherein the interference report indicates an energy map having at least one of a time dimension, a frequency dimension, or a spatial dimension.

Aspect 15: A method of wireless communication performed by a wireless communication device, comprising: transmitting serving beam information associated with the wireless communication device; and receiving information associated with an interference prediction, the information associated with the interference prediction being based at least in part on the serving beam information and an interference model, the interference model indicating locations of one or more clusters in a channel environment.

Aspect 16: The method of Aspect 15, wherein the serving beam information includes information indicating at least one of: a signal strength associated with a receive beam used by the wireless communication device, a location of the wireless communication device, a direction of the receive beam used by the wireless communication device, or a direction of a transmit beam used by the wireless communication device.

Aspect 17: The method of any of Aspects 15-16, wherein the information associated with the interference prediction indicates one or more transmission parameter adjustments to be applied by the wireless communication device.

Aspect 18: The method of Aspect 17, wherein the one or more transmission parameter adjustments include at least one of a transmission power adjustment, a beam change, or a beam direction change.

Aspect 19: The method of any of Aspects 15-18, further comprising transmitting an interference report indicating interference from one or more signals detected by the wireless communication device.

Aspect 20: The method of Aspect 19, wherein the one or more signals are associated with a coexisting service in the channel environment.

Aspect 21: The method of any of Aspects 19-20, wherein the interference report indicates at least one of: that the wireless communication device has or has not detected a signal of the one or more signals, a signal strength of the signal, a time domain resource associated with the signal, a frequency domain resource associated with the signal, or a spatial characteristic of the signal.

Aspect 22: The method any of Aspects 19-21, further comprising receiving parameter information associated with the one or more signals.

Aspect 23: The method of any of Aspects 19-22, further comprising transmitting capability information indicating that the wireless communication device is capable of performing signal detection associated with generating the interference report.

Aspect 24: The method of any of Aspects 19-23, wherein the interference report indicates an energy map having at least one of a time dimension, a frequency dimension, or a spatial dimension.

Aspect 25: The method of any of Aspects 19-24, further comprising compressing the interference report according to fixed codebook or an adaptable codebook.

Aspect 26: An apparatus for wireless communication at a device, comprising a processor; memory coupled with the processor; and instructions stored in the memory and executable by the processor to cause the apparatus to perform the method of one or more of Aspects 1-14.

Aspect 27: A device for wireless communication, comprising a memory and one or more processors coupled to the memory, the one or more processors configured to perform the method of one or more of Aspects 1-14.

Aspect 28: An apparatus for wireless communication, comprising at least one means for performing the method of one or more of Aspects 1-14.

Aspect 29: A non-transitory computer-readable medium storing code for wireless communication, the code comprising instructions executable by a processor to perform the method of one or more of Aspects 1-14.

Aspect 30: A non-transitory computer-readable medium storing a set of instructions for wireless communication, the set of instructions comprising one or more instructions that, when executed by one or more processors of a device, cause the device to perform the method of one or more of Aspects 1-14.

Aspect 31: An apparatus for wireless communication at a device, comprising a processor; memory coupled with the processor; and instructions stored in the memory and executable by the processor to cause the apparatus to perform the method of one or more of Aspects 15-25.

Aspect 32: A device for wireless communication, comprising a memory and one or more processors coupled to the memory, the one or more processors configured to perform the method of one or more of Aspects 15-25.

Aspect 33: An apparatus for wireless communication, comprising at least one means for performing the method of one or more of Aspects 15-25.

Aspect 34: A non-transitory computer-readable medium storing code for wireless communication, the code comprising instructions executable by a processor to perform the method of one or more of Aspects 15-25.

Aspect 35: A non-transitory computer-readable medium storing a set of instructions for wireless communication, the set of instructions comprising one or more instructions that, when executed by one or more processors of a device, cause the device to perform the method of one or more of Aspects 15-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. An interference sensor for wireless communication, comprising:
   at least one memory; and
   at least one processor communicatively coupled with the at least one memory, the at least one processor configured to cause the interference sensor to:
   receive serving beam information associated with a plurality of wireless communication devices;
   generate an interference model based at least in part on the serving beam information associated with the plurality of wireless communication devices, the interference model indicating locations of one or more clusters in a channel environment;
   obtain, using the interference model, information associated with an interference prediction for a transmitting wireless communication device; and
   transmit the information associated with the interference prediction to the transmitting wireless communication device.

2. The interference sensor of claim 1, wherein the plurality of wireless communication devices includes a receiving wireless communication device, and the serving beam information includes information indicating at least one of:
   a signal strength associated with a receive beam used by the receiving wireless communication device,
   a location of the receiving wireless communication device, or
   a direction of the receive beam used by the receiving wireless communication device.

3. The interference sensor of claim 1, wherein the plurality of wireless communication devices includes another transmitting wireless communication device, and the serving beam information includes information indicating at least one of:
   a location of the other transmitting wireless communication device, or
   a direction of a transmit beam used by the other transmitting wireless communication device.

4. The interference sensor of claim 1, wherein, to cause the interference sensor to obtain the information associated with interference prediction, the at least one processor is configured to cause the interference sensor to:
   provide serving beam information associated with the transmitting wireless communication device as an input to the interference model; and
   receive the information associated with the interference prediction as an output of the interference model, the information associated with the interference prediction indicating whether the transmitting wireless communication device would cause interference by using a beam identified in the serving beam information associated with the transmitting wireless communication device.

5. The interference sensor of claim 1, wherein the at least one processor is further configured to cause the interference sensor to:
   determine waveform information associated with a coexisting service in the channel environment, wherein the generation of the interference model is further based at least in part on the waveform information associated with the coexisting service.

6. The interference sensor of claim 5, wherein the information associated with the interference prediction indicates whether the transmitting wireless communication device would cause interference to the coexisting service by using a beam identified in serving beam information associated with the transmitting wireless communication device.

7. The interference sensor of claim 1, wherein the information associated with the interference prediction indicates one or more transmission parameter adjustments to be applied by the transmitting wireless communication device.

8. The interference sensor of claim 7, wherein the one or more transmission parameter adjustments include at least one of a transmission power adjustment, a beam change, or a beam direction change.

9. The interference sensor of claim 1, wherein the at least one processor is further configured to cause the interference sensor to:
receive an interference report from a wireless communication device of the plurality of wireless communication devices, the interference report indicating whether the wireless communication device has detected interference from one or more signals, wherein the generation of the interference model is further based at least in part on the interference report.

10. The interference sensor of claim 9, wherein the one or more signals are associated with a coexisting service in the channel environment.

11. The interference sensor of claim 9, wherein the interference report indicates at least one of:
that the wireless communication device has detected or has not detected a signal of the one or more signals,
a signal strength of the signal,
a time domain resource associated with the signal,
a frequency domain resource associated with the signal, or
a spatial characteristic of the signal.

12. The interference sensor of claim 9, wherein the at least one processor is further configured to cause the interference sensor to transmit parameter information associated with the one or more signals to the wireless communication device.

13. The interference sensor of claim 9, wherein the at least one processor is further configured to cause the interference sensor to receive capability information indicating that the wireless communication device is capable of performing signal detection associated with generating the interference report.

14. The interference sensor of claim 9, wherein the interference report indicates an energy map having at least one of a time dimension, a frequency dimension, or a spatial dimension.

15. A wireless communication device for wireless communication, comprising:
at least one memory; and
at least one processor communicatively coupled with the at least one memory, the at least one processor configured to cause the wireless communication device to:
transmit serving beam information associated with the wireless communication device; and
receive information associated with an interference prediction, the information associated with the interference prediction being based at least in part on the serving beam information and an interference model, the interference model indicating locations of one or more clusters in a channel environment.

16. The wireless communication device of claim 15, wherein the serving beam information includes information indicating at least one of:
a signal strength associated with a receive beam used by the wireless communication device,
a location of the wireless communication device,
a direction of the receive beam used by the wireless communication device, or
a direction of a transmit beam used by the wireless communication device.

17. The wireless communication device of claim 15, wherein the information associated with the interference prediction indicates one or more transmission parameter adjustments to be applied by the wireless communication device.

18. The wireless communication device of claim 17, wherein the one or more transmission parameter adjustments include at least one of a transmission power adjustment, a beam change, or a beam direction change.

19. The wireless communication device of claim 15, wherein the at least one processor is further configured to cause the wireless communication device to transmit an interference report indicating interference from one or more signals detected by the wireless communication device.

20. The wireless communication device of claim 19, wherein the one or more signals are associated with a coexisting service in the channel environment.

21. The wireless communication device of claim 19, wherein the interference report indicates at least one of:
that the wireless communication device has or has not detected a signal of the one or more signals,
a signal strength of the signal,
a time domain resource associated with the signal,
a frequency domain resource associated with the signal, or
a spatial characteristic of the signal.

22. The wireless communication device of claim 19, wherein the at least one processor is further configured to cause the wireless communication device to receive parameter information associated with the one or more signals.

23. The wireless communication device of claim 19, wherein the at least one processor is further configured to cause the wireless communication device to transmit capability information indicating that the wireless communication device is capable of performing signal detection associated with generating the interference report.

24. The wireless communication device of claim 19, wherein the interference report indicates an energy map having at least one of a time dimension, a frequency dimension, or a spatial dimension.

25. The wireless communication device of claim 19, wherein the at least one processor is further configured to cause the wireless communication device to compress the interference report according to fixed codebook or an adaptable codebook.

26. A method of wireless communication performed by a device, comprising:
receiving serving beam information associated with a plurality of wireless communication devices;
generating an interference model based at least in part on the serving beam information associated with the plurality of wireless communication devices, the interference model indicating locations of one or more clusters in a channel environment;
obtaining, using the interference model, information associated with an interference prediction for a transmitting wireless communication device; and
transmitting the information associated with the interference prediction to the transmitting wireless communication device.

27. The method of claim 26, wherein obtaining the information associated with interference prediction comprises:
- providing serving beam information associated with the transmitting wireless communication device as an input to the interference model; and
- receiving the information associated with the interference prediction as an output of the interference model, the information associated with the interference prediction indicating whether the transmitting wireless communication device would cause interference by using a beam identified in the serving beam information associated with the transmitting wireless communication device.

28. The method of claim 26, further comprising:
- determining waveform information associated with a coexisting service in the channel environment, wherein the generation of the interference model is further based at least in part on the waveform information associated with the coexisting service.

29. A method of wireless communication performed by a wireless communication device, comprising:
- transmitting serving beam information associated with the wireless communication device; and
- receiving information associated with an interference prediction, the information associated with the interference prediction being based at least in part on the serving beam information and an interference model, the interference model indicating locations of one or more clusters in a channel environment.

30. The method of claim 29, wherein the serving beam information includes information indicating at least one of:
- a signal strength associated with a receive beam used by the wireless communication device,
- a location of the wireless communication device,
- a direction of the receive beam used by the wireless communication device, or
- a direction of a transmit beam used by the wireless communication device.

\* \* \* \* \*